United States Patent Office.

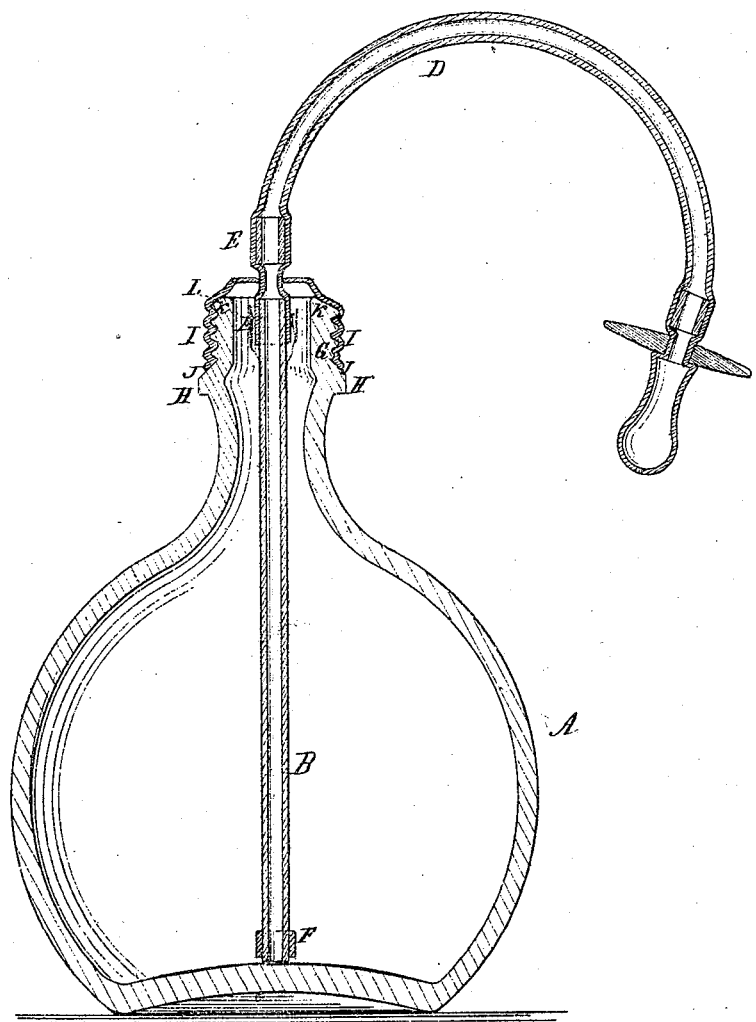

JOHN L. MASON, OF NEW YORK, N. Y.

Letters Patent No. 102,417, dated April 26, 1870.

IMPROVEMENT IN NURSING-BOTTLES.

The Schedule referred to in these Letters Patent and making part of the same.

To all whom it may concern:

Be it known that I, JOHN L. MASON, of the city, county, and State of New York, have invented a new and useful Improvement in Nursing-Bottles; and I do hereby declare the following to be a full, clear, and exact description thereof, which will enable those skilled in the art to make and use the same, reference being had to the accompanying drawing forming part of this specification, which drawing (consisting of one figure) shows a central section of my improvement.

This invention consists in securing the rubber tube in the cover by glass stops inserted in the tube on either side of the cover.

The letter A designates the bottle, and

B D is a compound tube, which goes through a perforation in the top of the screw-cap or cover C.

That part of the tube which is outside of the bottle is made of rubber, and I secure and suspend it to the cap or cover by means of tubular glass stops E E, the lower one of which may be separate from a part of the tube B, and both being placed inside the tube, on each side of the cover, in such a manner that the continuity of the tube is not interrupted, and yet the tube is thereby so connected to the cover that it will not move in either direction, whether the cap or cover is screwed to the bottle, or detached therefrom.

The rubber portion D of the tube extends a little distance into the neck of the bottle, where it is connected to a glass tube, B, which extends down nearly to the bottom of the bottle; and the lower end of the glass tube is surrounded by a rubber protecting-ring, F, which is intended to prevent noise, and also injury to the glass tube from striking against the sides of the bottle.

I do not claim in this application the peculiar construction of the cover; but

What I claim as new, and desire to secure by Letters Patent, is—

Securing the rubber tube D in the cover C by glass stops inserted in the tube on either side of the cover, substantially as described.

JOHN L. MASON.

Witnesses:
   C. WAHLERS,
   E. F. KASTENHUBER.